(12) United States Patent
Helmstetter

(10) Patent No.: US 6,792,197 B1
(45) Date of Patent: Sep. 14, 2004

(54) SYSTEM AND METHOD FOR GENERATING VIDEO TAPING REMINDERS

(75) Inventor: Gary Helmstetter, Harvard, MA (US)

(73) Assignee: Index Systems, Inc., Tortola (VG)

(*) Notice: Subject to any disclaimer, the term of this patent is extended or adjusted under 35 U.S.C. 154(b) by 0 days.

(21) Appl. No.: 09/456,132

(22) Filed: Dec. 7, 1999

Related U.S. Application Data

(60) Provisional application No. 60/111,196, filed on Dec. 7, 1998.

(51) Int. Cl.$^7$ ................................................ H04N 5/91
(52) U.S. Cl. ........................... 386/83; 386/95; 725/39; 725/58
(58) Field of Search .............................. 386/46, 83, 95, 386/96, 52; 725/39, 58, 109, 43, 104, 60, 47, 37, 116, 44, 42, 36, 45, 46; 360/72.2

(56) References Cited

U.S. PATENT DOCUMENTS

| | | | | |
|---|---|---|---|---|
| 5,621,456 A | * | 4/1997 | Florin et al. ................... | 725/58 |
| 5,805,763 A | * | 9/1998 | Lawler et al. ................. | 386/83 |
| 5,977,964 A | * | 11/1999 | Williams et al. .............. | 386/83 |
| 5,990,927 A | * | 11/1999 | Hendricks et al. ........... | 725/132 |
| 6,016,141 A | * | 1/2000 | Knudson et al. ............. | 725/104 |
| 6,029,195 A | * | 2/2000 | Herz ............................ | 725/116 |
| 6,167,188 A | * | 12/2000 | Young et al. .................. | 386/83 |
| 6,341,047 B1 | * | 1/2002 | Ishii et al. ................... | 360/72.2 |
| 6,341,374 B2 | * | 1/2002 | Schein et al. ................ | 725/43 |
| 6,470,497 B1 | * | 10/2002 | Ellis et al. .................... | 725/39 |
| 6,545,722 B1 | * | 4/2003 | Schulttheiss et al. ........ | 725/109 |
| 6,564,379 B1 | * | 5/2003 | Knudson et al. ............. | 725/42 |

FOREIGN PATENT DOCUMENTS

| | | |
|---|---|---|
| WO | WO 98/27723 | 6/1998 |
| WO | WO 98/39918 | 9/1998 |

* cited by examiner

*Primary Examiner*—Thai Tran
*Assistant Examiner*—Christopher Onuaku
(74) *Attorney, Agent, or Firm*—Fish & Neave

(57) ABSTRACT

Electronic Guide products give the user the ability to videotape selected programs. Once a program has successfully been taped a message is displayed, reminding the viewer that they have taped it. (E.g. "You taped Xxxxx; have you watched it yet?") Information comprising information that shows are taped, the particular shows taped and viewer profiles allow advertisements targeted to the viewer who typically records a given type of programming to be presented. In an embodiment the display of the reminders is made conditional upon acceptance of advertising (for example, based on a piece of data transmitted along with other data related to that show), and can be sold to the broadcasters who transmitted the show. This information is marketed as a peculiarly well-targeted ad for the show, causing it to continue to produce value for the broadcaster after the broadcast is complete. Broadcasters, in turn, may offer the reminders to major advertisers as they sell commercial air time during the show, as a premium feature of the air time. The advertisement may be sent over channels comprising the video blanking interval, the Internet or on another channel.

25 Claims, 11 Drawing Sheets

Fig. 9

LIBRARY FORMAT

TAPE NO. 1
    TARZAN
    TERMINATOR

TAPE NO. 2
    <u>CAR GUIDE</u>
    MERCEDES VIDEO CLIP
    LEXUS VIDEO CLIP

<u>SPORTS GUIDE</u>
    NFL MONDAY NITE FOOTBALL CLIP
    NHL PREVIEWS

TAPE NO. 3
    <u>RESTAURANT GUIDE</u>
    ALICES RESTAURANT
    MADEO'S
    22ND ST. LANDING
    ⋮

TAPE NO. 4
    ⋮

SYSTEM AND METHOD FOR GENERATING VIDEO TAPING REMINDERS

CROSS-REFERENCE TO RELATED APPLICATION

This application claims the benefit of U.S. Provisional Patent Application No. 60/111,196, filed Dec. 7, 1998, the contents of which are hereby incorporated by reference.

BACKGROUND OF THE INVENTION

This invention relates generally to electronic guides and particularly to electronic television guides capable of programming a video recorder and displaying an index of previously recorded video and/or information clips.

Unattended recording of television signals for later viewing is commonly done to accommodate an individual viewer's schedule. This process is becoming increasingly automated. Many programs can be recorded at the touch of a button. Keeping track of what a viewer has recorded becomes increasingly difficult. Advertisers and/or program sponsors tend to find it of value to bring their program that has been recorded to the attention of the viewer, above a group of other recorded programs. A videotaping reminder that is selectively assigned to scheduled programs is desirable to accomplish this.

To catalog material recorded on a videotape a written index may be used. However, viewers often use a videotape as a temporary storage device to view previously recorded, or time shifted, material at their convenience. An electronic index recorded on the videotape is a desirable means of identifying the contents of a given video cassette. Directories that allow a user to select a program and advance the tape to the selected program provided a convenient means of recording videotaped contents, and subsequently viewing them.

If a viewer records programs over several days or several weeks they have forget what was recorded. Alternatively, a viewer may simply have forgotten that a particular program had been taped. Accordingly, it would be desirable to provide a device that reminds the viewer that a particular program has been taped, and provides an indication of its location.

Advertisers seek to place targeted adds whenever possible, to capture a viewer's attention. Merchants also desire to target an advertisement to a particular viewer, based on a profile of viewer information. Thus, a format, such as a videotaping reminder, that provides an opportunity for an advertiser to gain a viewer's attention and/or target an advertisement to a particular viewer profile is desirable.

SUMMARY OF THE INVENTION

There is therefore provided in a present embodiment of the invention a process for generating a videotaping reminder. First an electronic program guide ("EPG") is displayed on a viewer's display device. The viewer then enters the EPG and displays a schedule of programs. The viewer then selects a program listed in the schedule for recording. The VCR is programmed to record the program selected, and the program is subsequently recorded. After recording the guide determines if a videotaping reminder has been assigned to the program recorded. If a videotaping reminder has been assigned to the recorded program it is activated.

Many of the attendant features of this invention will be more readily appreciated as the same becomes better understood by reference to the following detailed description considered in connection with the accompanying drawings.

DESCRIPTION OF THE DRAWINGS

These and other features and advantages of the present invention will be better understood from the following detailed description read in light of the accompanying drawings, wherein:

FIG. 9 is an illustration of a tape library format;

DETAILED DESCRIPTION OF THE INVENTION

Figure 1:
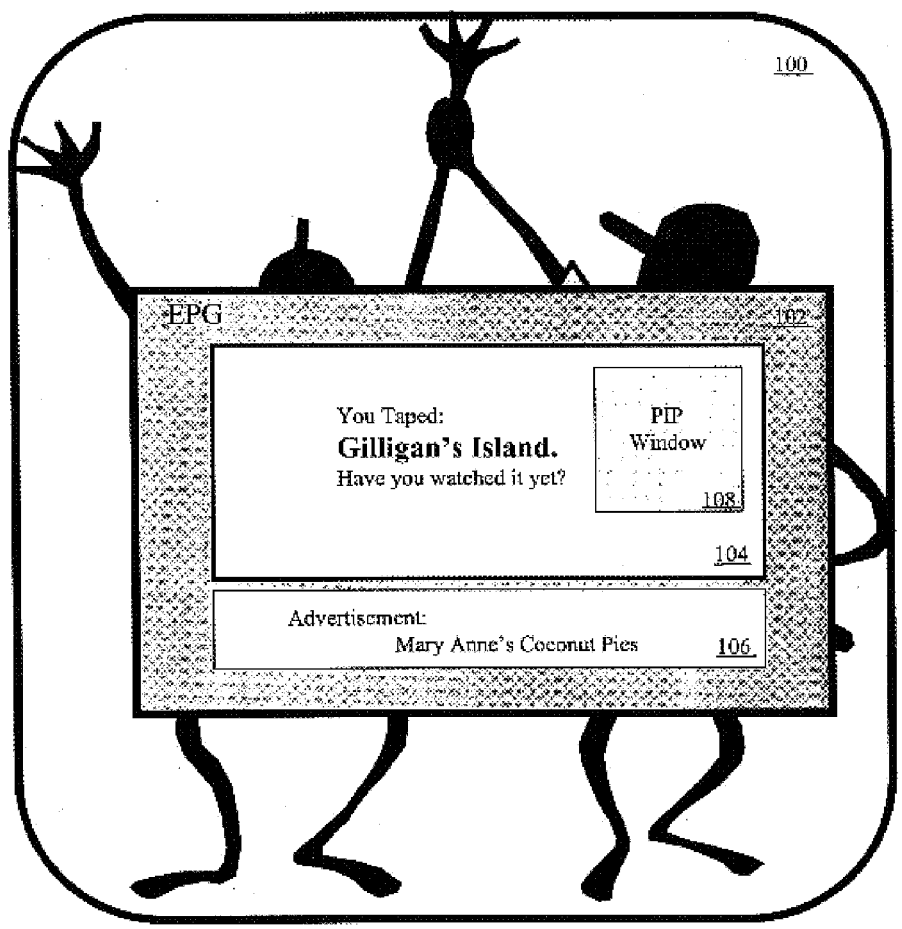
FIG. 1 is an illustration of a video taping reminder.

FIG. 1 is an illustration of a video taping reminder. Electronic program guides ("EPG") are increasingly being used by television viewers in order to evaluate program selections. EPGs are used to view schedule information of upcoming programs. Additionally, EPGs are used to sort programming, and otherwise aid a television viewer in increasing their enjoyment of their video equipment. For example, an EPG may be used to sort program listings by content, or viewer preference. Additionally, a viewer may generate a schedule of programs to watch, where the television tunes from one program to the next based upon a viewer's previously recorded selections. A viewer may also generate a video recording schedule with an EPG. This schedule may be viewed. By using an EPG recording schedule, a number of programs may be recorded by the viewer by selecting them from an EPG schedule.

Programs may be recorded on a one time basis or periodically. Also, an EPG may be programed to skip programs if a rerun is encountered. With this degree of automation in repetitive recording, and the scheduling of the recording of multiple programs, it is easy for a viewer to forget that they have recorded a particular program. A recording schedule may be consulted to determine which program has been recorded. However, consulting the recording schedule requires an affirmative action on the part of the viewer.

Program sponsors and/or advertisers who wish to make their recorded program stand out from a recorded program listing may elect to utilize a video taping reminder.

A video taping reminder consists of anything to cue a viewer that a program has been recorded. In the general sense it may alert the viewer that any program has been recorded. However in an embodiment it is an alert that a particular program has been recorded. A cue may consist of a visual indication, a textual indication, an audio indication, or a combination of these indicator signals. The cue is anything that may be used to alert the viewer that a program has been recorded.

In an embodiment of a video taping reminder shown in FIG. 1, the video taping reminder comprises a textual and graphical display on a television screen 100. The video taping reminder 104 is shown presented as a portion of a guide page 102. In another embodiment the reminder is displayed independent of the EPG. In an embodiment an advertisement 106 may be displayed in conjunction with a video taping reminder 104. The reminder and the advertisements present may be displayed in a picture in picture ("PIP") box.

For example, during a previous viewing session, a television viewer consults the EPG and decides to record a television program. The viewer enters the recording mode and selects the program to be recorded. At this point, the VCR is set up to automatically record the program selection, and does so. Sometime later the viewer switches off the set, or continues viewing other programs. The next time the viewer activates his set, or at a predefined time after completion of videotaping, a video taping reminder 104 is displayed with an indication to the viewer that a particular program has been video taped and is awaiting playback. In an embodiment a video clip of the recorded program may be displayed in a PIP window associated with the reminder 108.

Alternatively, a viewer may be cued with a video taping reminder of an audio signal or an icon present on the television screen. In fact, any cue capable of being perceived by a viewer as a reminder that a television program has been video taped and not viewed comprises a videotaping reminder to a viewer.

Reminders may be associated with particular television programs or with all programs. In an embodiment, an advertiser who wishes to make their recorded program stand out to the viewer may choose to pay a fee for the privilege. A packet of data sent with scheduling information of the EPG and associated with the sponsor's scheduled program causes a reminder to be activated when that particular program is recorded. Thus, a program so marked, will display a video taping reminder after it has been recorded.

Figure 2:
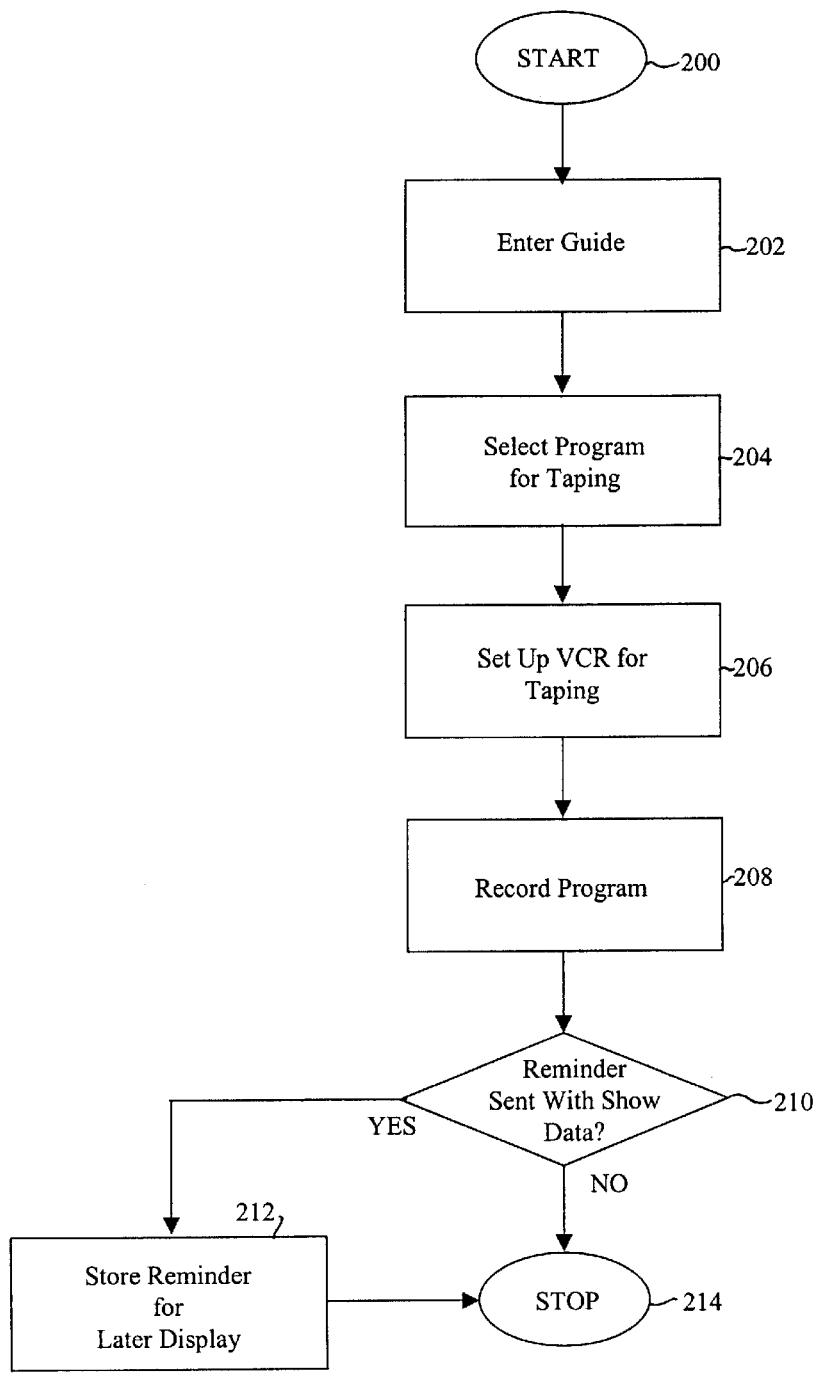
FIG. 2 is a flow diagram of the process to generate a video taping reminder.

FIG. 2 is a flow diagram of the process to generate a video taping reminder. The process start at 200 by a viewer's first entering an EPG 202. The viewer next selects a program for taping 204. In selecting a program for taping, the viewer may access a specialized recording grid that presents a visual indication of which programs have been selected for recording and allows selection of additional programs to be recorded. Alternatively, a program selected for taping may be selected from a program listing in a EPG and designated for recording by pressing an appropriate function key on a control panel.

When the scheduled taping time for a program arrives, the VCR is set up for taping the program 206. The VCR tunes to the selected channel. In an embodiment the VCR checks a code in the guide corresponding to the selected program and compares it to a code transmitted with the program to be taped. If the codes match, recording is initiated. In another embodiment, the codes would not be checked. In this case, the VCR automatically starts to record at the designated time. The use of codes allows verification between programs selected in the EPG, to that broadcast to account for scheduled changes in program lineup and delays due to earlier program time overruns.

In a further embodiment, as part of the setup for taping, indexing of the tape is initiated and stored in a directory residing on the tape.

Next, the program is recorded at step 208. While recording, the EPG checks to see if a video taping reminder has been sent along with the show data 210. Alternatively, in an embodiment, the check for the reminder may be performed during the selection of the program for taping 204 or at any other step in the recording process 206, 208. In a further embodiment the check may be performed after taping is complete.

In an embodiment, data concerning a show is sent, along with other schedule information, to a viewer's location during a video blanking interval ("VBI") of another program presented during the day, or during off times in the evening, when the fee for utilizing the VBI is lower. This is an opportune time to send a videotaping reminder that will be associated with a given show when it is recorded. If an advertiser or sponsor desires to place a reminder when a particular show is being recorded, the reminder may be sent over the video blanking interval with other scheduled data. In an embodiment, a reminder may be sent by other means such as through an Internet or telephone connection.

If a reminder has been assigned and transmitted with the show data, the reminder is stored for later display 212. The reminder may be stored in a volatile or non-volatile memory associated with the EPG. Alternative, storage devices comprise disk drives, optical storage media and magnetic tape and the like. The reminder may be generated locally, with the trigger for the reminder to be displayed, being sent from a service provider. After the reminder is stored, the process is at an end 214.

Now that the process has been completed, the next time the television is turned on, or at a later predetermined time after taping, a reminder will be displayed that a particular show has been recorded. Provided the sponsor or advertiser desires to associate the reminder with the recording process and the service provider has sent it. A service provider would typically activate a reminder after an advertiser or sponsor pays a fee to activate the service.

Figure 3:
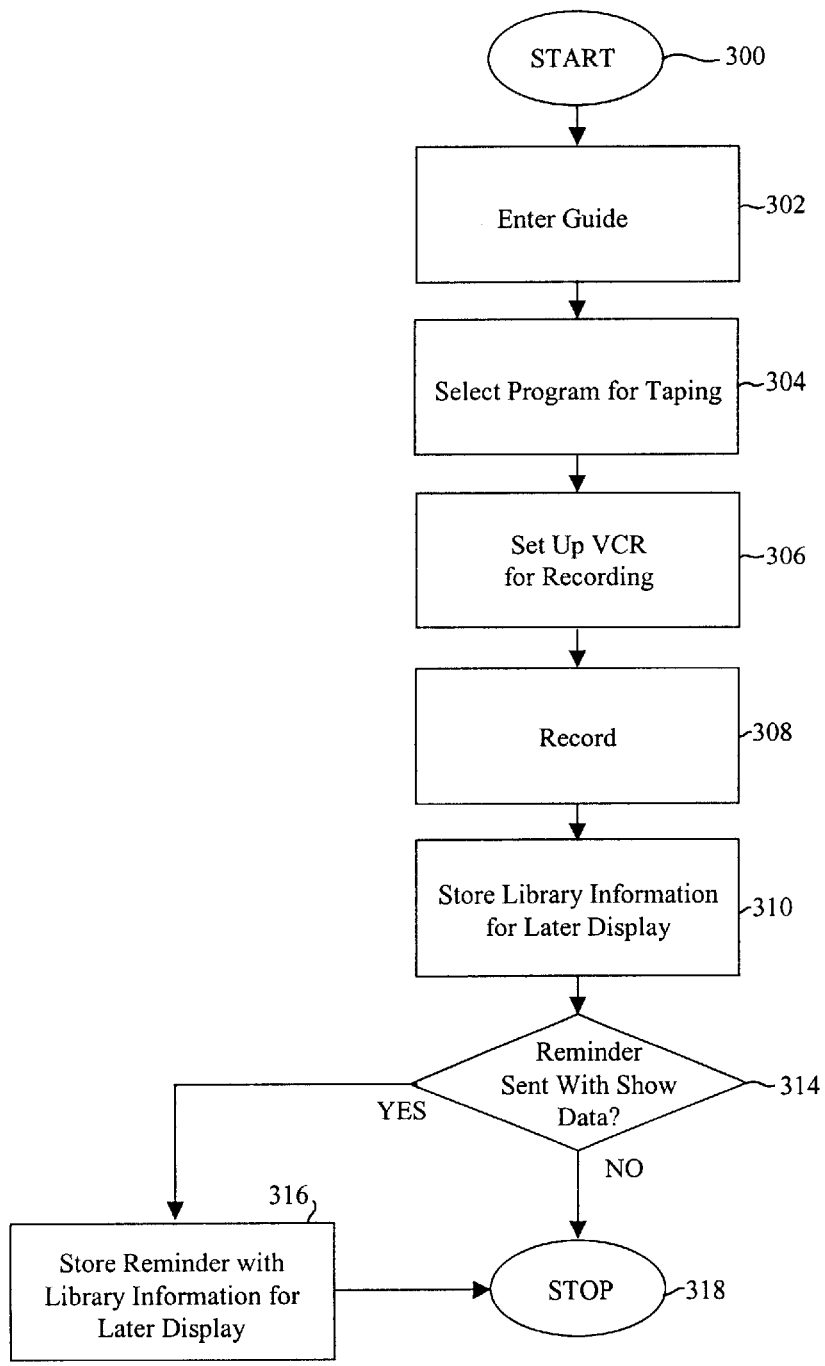
FIG. 3 is a flow diagram of the process to generate and retrieve a video taping reminder associated with a tape library.

FIG. 3 is a flow diagram of the process to generate and retrieve a video taping reminder associated with a tape library. The processes initialized at step 300 and an EPG is entered at step 302. Next, a program for taping is selected from one of the various menus in an EPG at step 304. At the appropriate time, prior to recording, the VCR is set up at step 306. This set up includes the generation of start and stop locations on the tape being used for the current recording, and their entry into a library listing the present tape as a volume in the index. The Library is typically stored in an electronic memory. Next, at the scheduled start time, the program is recorded 308.

Next, the library information is stored for later display 310. This storage of library information is on the video tape. In an embodiment, library information is stored in volatile or non-volatile memory associated with the electronic guide. This memory is typically resident in a VCR, a set top box or the television. Any means of electronic retrieval capable of storing the library information may be employed. Next, an inquiry is made as to whether or not a reminder has been sent with show data 314. If the video taping reminder has been sent, this reminder is stored in memory for later electronic retrieval with the library information 316, previously stored.

The library information and reminder need not be stored in the same type of memory device. The only requirement upon the memory location is that a processor executing the steps of the process is able to locate the data for display. A display of library information with the video taping reminder would tell the viewer that he has recorded a program on a particular video tape. If the viewer desires to view the show, he knows which tape to load, if not already loaded. The library also provides an indication of the length of the program taped and the location of the program on the tape. To remind the viewer that a show has been taped, the particular tape that the show was on need not be loaded into the VCR.

Figures 4, 5:
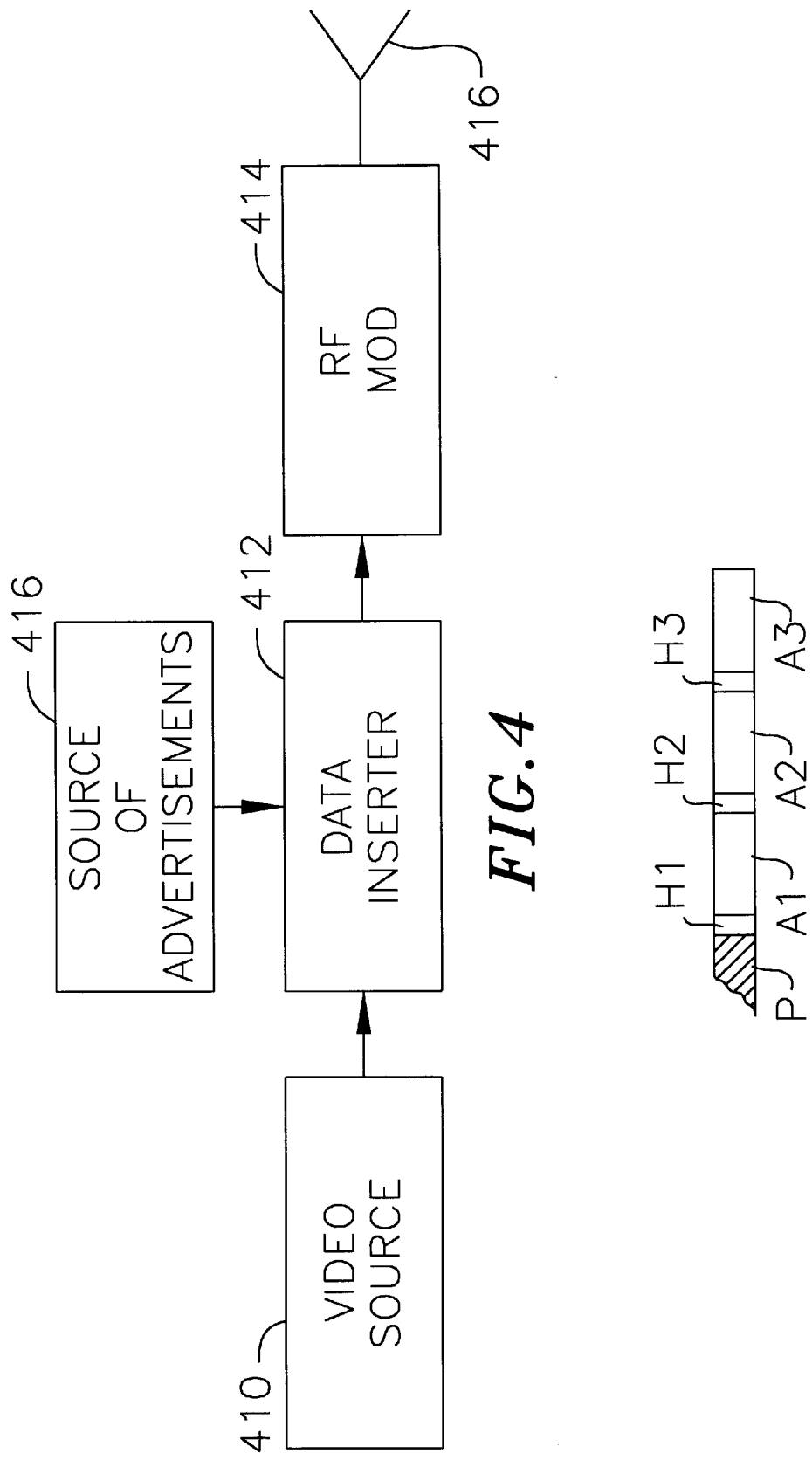
FIG. 4 is a block diagram of a circuit that inserts information into a broadcast signal.
FIG. 5 is a block diagram of the serial transmission of packets of data.

FIG. 4 is a block diagram of a circuit that inserts information into a broadcast signal. To insert data such as a video taping reminder into a vertical blanking interval, a circuit that accomplishes the function shown in FIG. 4 is utilized. A video source 410 is input to a data inserting device 412. The data inserter looks for a set of retrace lines that comprise a VBI of a video signal. The data inserting device 412 inserts supplemental information, such as a video taping reminder, in the blanking intervals for later retrieval. The information inserted may be a source of advertisements 416, or as well as a videotaping reminder.

Alternatively, additional information may be inserted in addition to the reminder. Additional information may consist of audio or visual cues that a sponsor or advertiser desires to associate with the video taping reminder. Next, the composite signal of supplemental information and video signal output from the data inserter 412 is modulated on to an RF carrier 414.

The RF signal is then suitable for presentation to a network for distribution 416. The RF signal may be distributed by a cable television network, a wireless network or by appropriate additional signal conditioning over the Internet.

FIG. 5 is a block diagram of a serial transmission of packets of data. Information inserted into a video signal as shown in FIG. 4, typically consists of packets of digital information. Each packet comprises a distinct message A1, A2, A3 separated from the other messages by a preamble H1, H2, H3 that announces the end of the previous packet and the beginning and function of the current packet. The information being communicated is contained in packets labeled A1, A2, A3.

Figure 6:
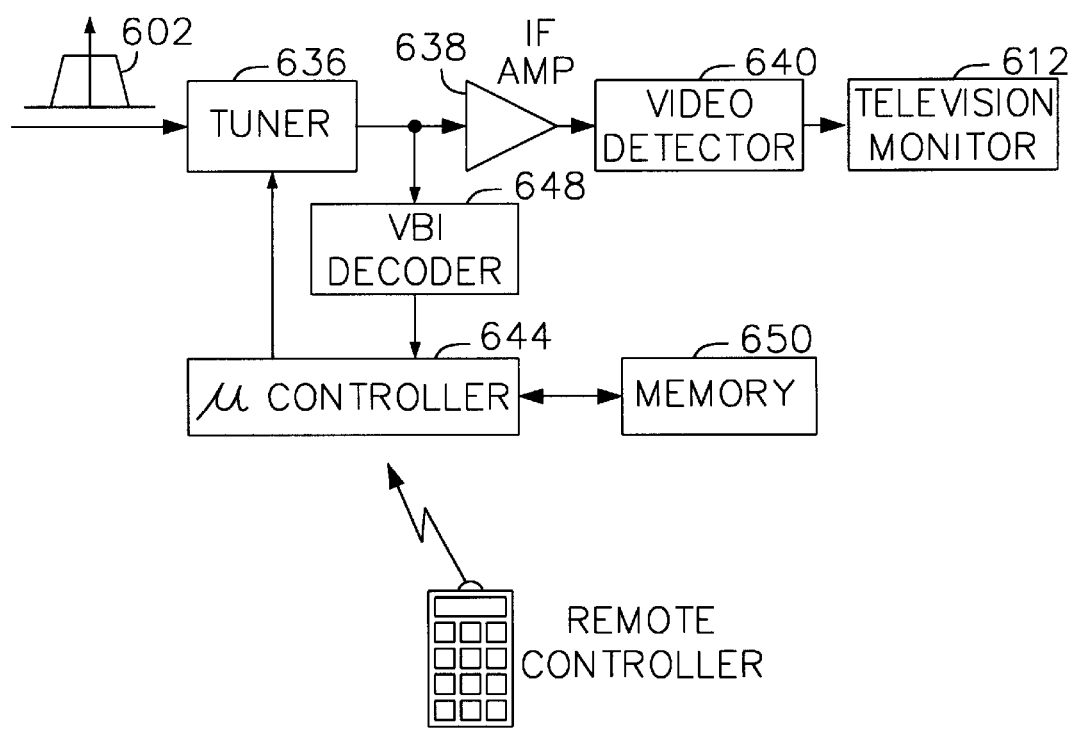
FIG. 6 is a block diagram of a receiver for separating data encoded in a VBI from a video signal.

FIG. 6 is a block diagram of a receiver for separating data encoded in a VBI from a video signal. A signal 602 is received by a tuner 636 and converted to an intermediate frequency ("IF") signal that is easier to process. The intermediate frequency signal is split and sent to an IF amplifier 638 and a VBI decoder 648. The IF amplifier 638 amplifies the weak signal before it is routed to a video detector 640. The video detector 640 converts the intermediate frequency signal to a base band signal, or video signal, suitable for presentation to a television monitor 642. The video signal has an audio signal that is associated with it. The audio signal transmitted along with the video signal is presented to a speaker associated with the television monitor 642. Returning to the output of tuner 636, that is output to the VBI decoder 648, the supplemental information is extracted from the VBI of the IF signal. The VBI signal is separated and converted to a base band signal when the decoder detects the blanking interval, and strips the packets of data from the signal. A micro-controller 644 decodes the data contained in the packets, storing the information in memory 650 for later utilization with an EPG display.

Figure 7:
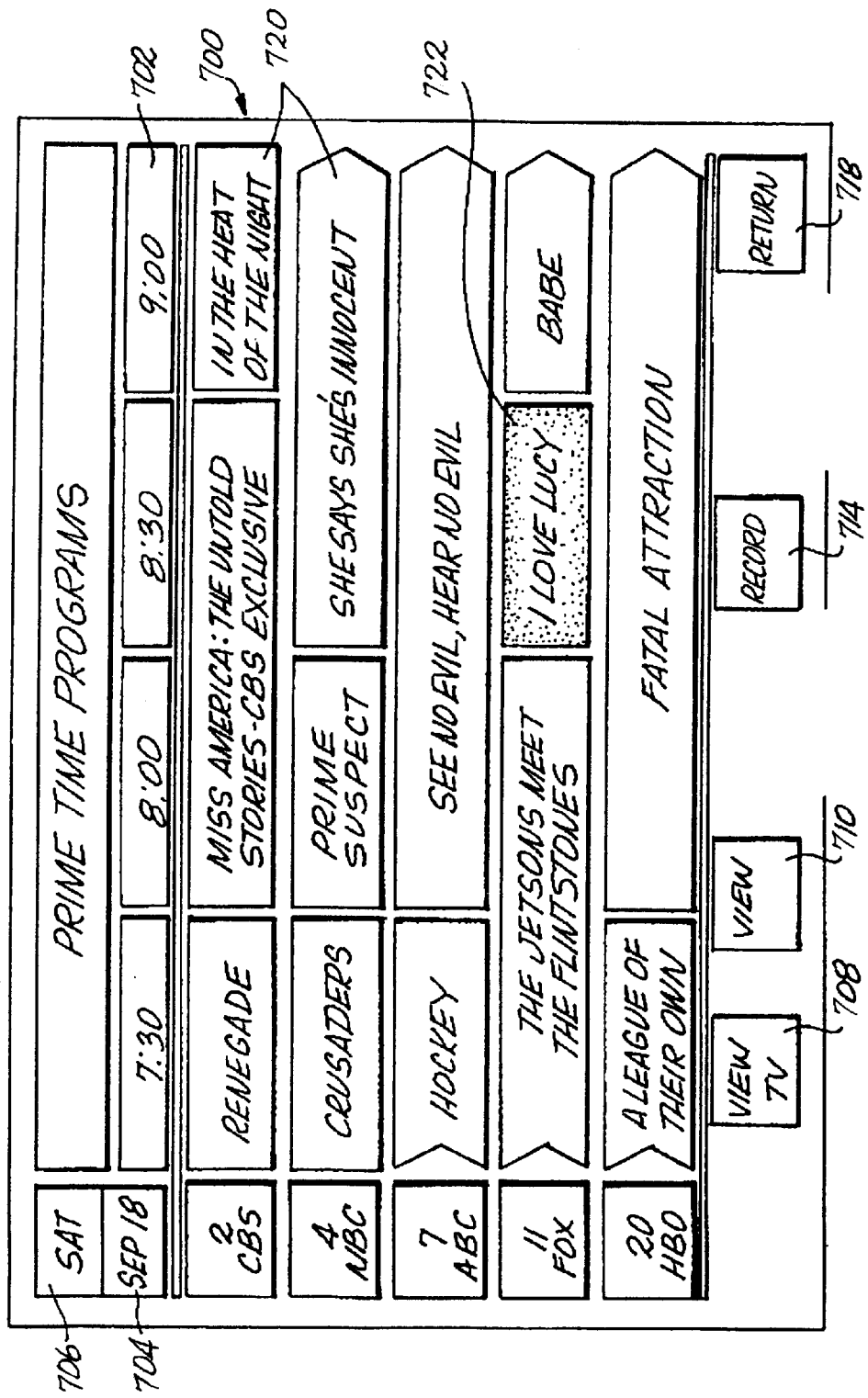
FIG. 7 is an illustration of an embodiment of a guide screen showing several hours of programming.

FIG. 7 is an illustration of an embodiment of a guide screen showing several hours of programming. Programming 702 is shown for a given day 706 and date 704. A guide screen 700 shows programming information 720 for various channels that are available to a viewer. The guide screen also makes available the activation of various functions through the guide. A view 710, view TV 708, record 714 and return 718 functions are available through the guide screen to the viewer. In the embodiment, a cursor is positioned over the desired function and a selection is made. In the embodiment, the cursor and the selection function are activated via a remote control device.

To program recording of a later program on another channel, the record function 714 is utilized. For example, to record Channel 11's 8:30 program of "I Love Lucy" 722, the cursor is positioned on the "I Love Lucy" box 722 and the selection button is pressed, highlighting the selection. After selection of a program, the viewer's next activates the record button 714 so that at 8:30, Channel 11 is tuned to and "I Love Lucy" is recorded.

Figure 8:
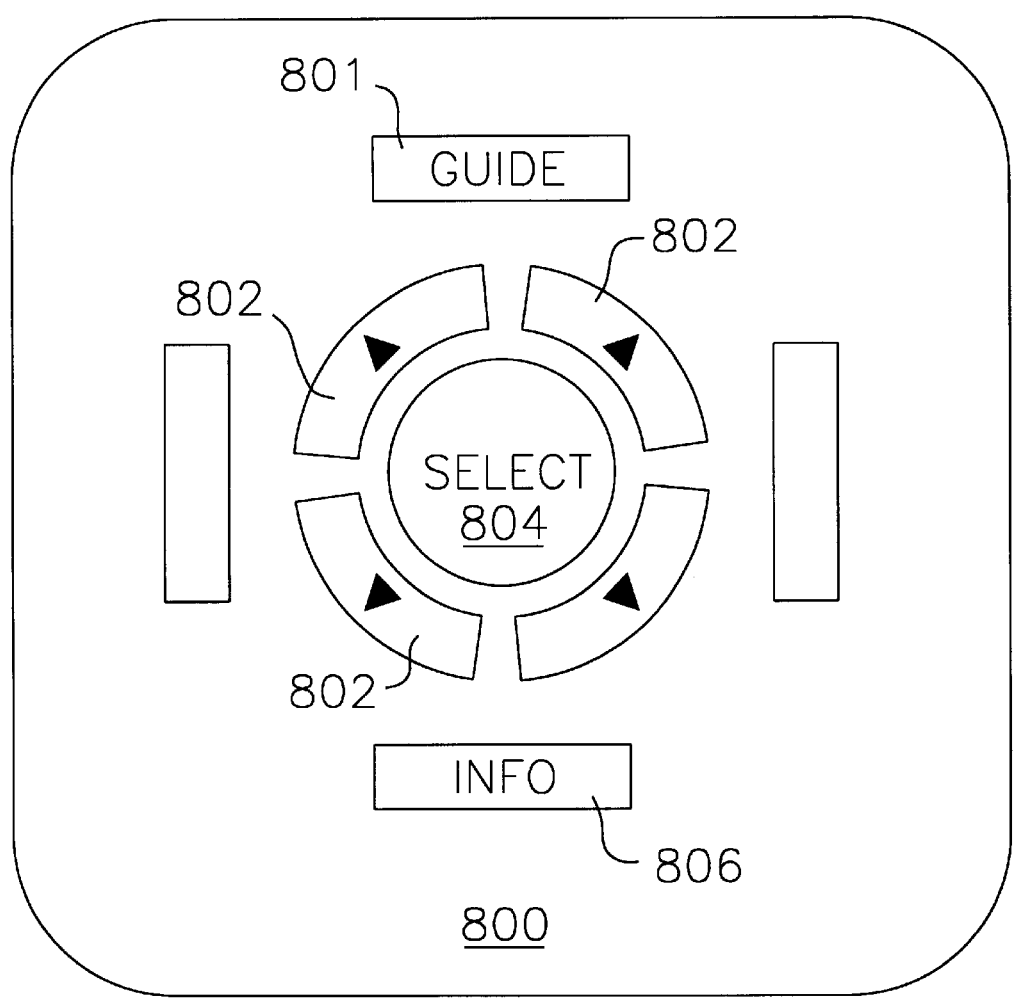
FIG. 8 is an illustration of an embodiment of a remote control unit suitable for activating an electronic guide.

FIG. 8 is an illustration of an embodiment of a remote control unit suitable for activating an electronic guide as described in FIG. 7. A guide screen is activated by pressing the guide button 801. A cursor may be moved about upon a picture screen by pushing one of the cursor movement keys 802. Once a cursor has been positioned appropriately on the screen over a guide selection, the select button 804 is pressed to make the selection.

FIG. 9 is an illustration of a tape library format. A tape library is typically stored in a random access memory. Each time a tape is accessed, its contents are entered into the library by tape number of the tape that has been played. The contents of the library may be decoded by a microprocessor and presented for display on a video display by an on screen display controller.

Figure 10:
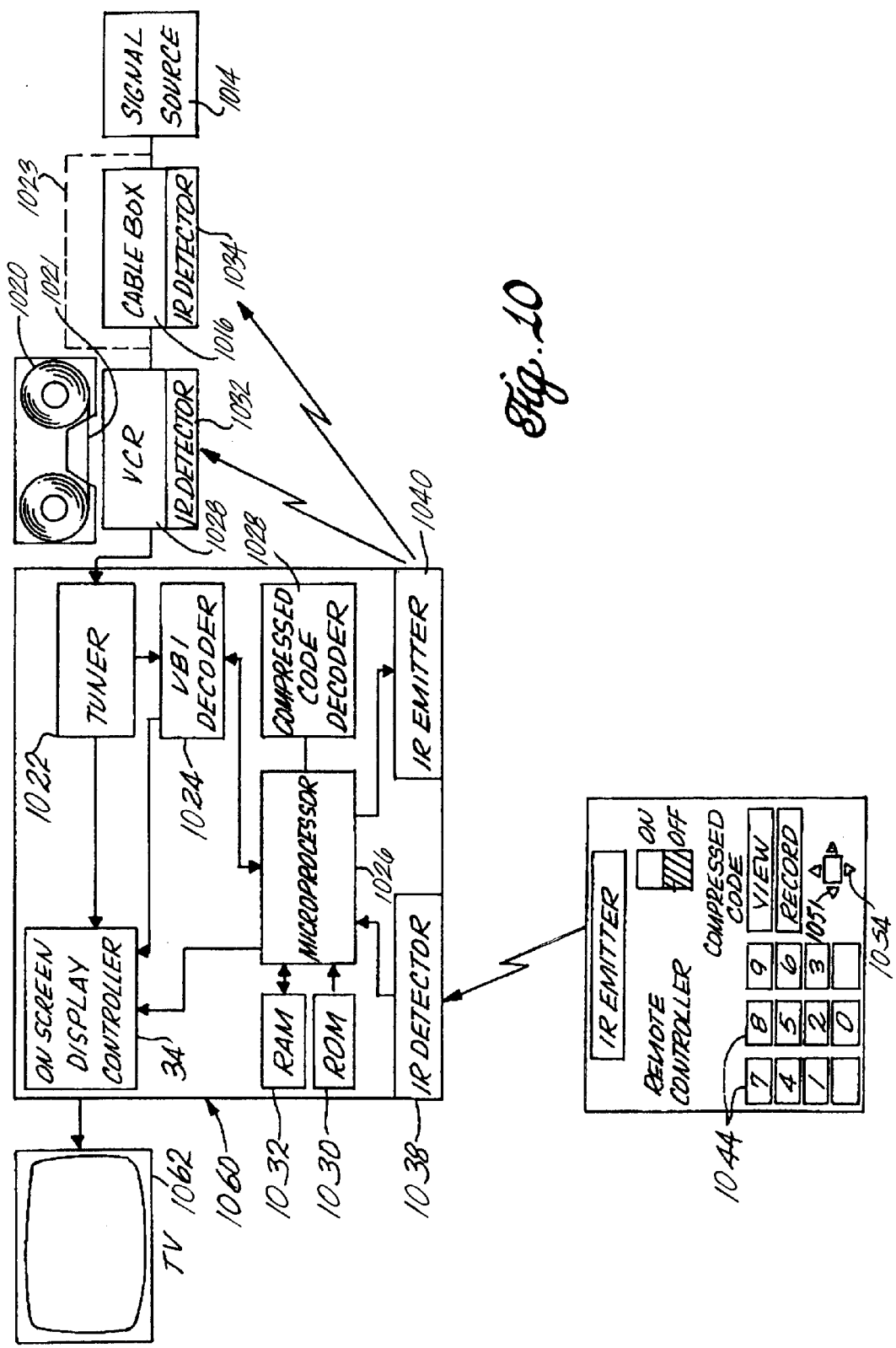
FIG. 10 is a block diagram of a VBI decoder functioning in conjunction with a VCR, television and remote control unit.

FIG. 10 is a block diagram of a VBI decoder functioning in conjunction with a VCR, television and remote control unit. A controller for accessing programs stored on a video cassette tape is shown 1060. A conventional video display having a video input 1062 is used in conjunction with the controller 1060 that is placed between video display 1062 and a video cassette recorder 1018. The controller 1060 has a tuner 1022 coupled to a VBI decoder 1024 and a microprocessor 1026 that interfaces to a random access memory 1032 and a read only memory 1030. The tuner 1022 interfaces to on screen display controller 1034 which also interfaces to VBI decoder 1024 and microprocessor 1026. The controller receives an infrared signal at infrared detector 1038 from remote controller 1012. The commands received by IR detector 1038 are processed by microprocessor 1026. The microprocessor also interfaces to and from a vertical blanking interval decoder 1024.

The read only memory 1030 includes a section for instructions on the control of microprocessor 1026. An additional section is included for decoding infrared codes received by IR detector 1038. The section for infrared codes comprises decoding of codes for controlling a VCR with play, record, rewind, stop and index functions. Also included in the read only memory 1030 are sections for storage of a directory, a guide data section, and a library section.

Directory, guide data and library information are provided to microprocessor 1026 from VBI decoder 1024. This information is stored in the vertical blanking interval present in the television signal being played back through tuner 1022 by the VCR 1018. The video signal output by VCR 1018 is a video signal that comprises vertical blanking intervals of an interlaced television scanning raster.

A first field of a video television signal starts at an upper left corner of a television screen and writes a series of lines to the bottom of the screen. At the bottom of the screen, a beam writing the screen retraces in a series of lines back to the top of the screen. The series of retraced lines are designated as vertical blanking interval lines. During the retrace period, writing to a screen is blanked. However, a signal is still present and additional information can be sent during the vertical blanking interval. The vertical blanking interval comprises 1020 lines available per frame to encode data onto. After the vertical blanking interval, a second video frame is written to the screen followed by another vertical blanking interval.

A vertical blanking interval ("VBI") is present on a video cassette tape. The video cassette tape has audio and video tracks. The video track records the video signal that contains the vertical blanking interval.

In the invention, data packets are inserted in the vertical blanking interval. For example, a packet of data containing tape identification number, program number and an absolute address may be stored on a vertical blanking interval line. Also, a directory may be stored on a vertical blanking interval line in accordance with the principles of the invention. During recording, data is inserted into the vertical blanking interval of the signal being recorded on video tape by a VBI inserter circuit. During playback, information on the VBI on the recording tape is decoded by the VBI decoder 1024 and stored in random access memory 1032. After a series of video cassettes are played in a video cassette recorder, a library of tapes and their contents is accumulated and the random access memory 1032.

A television for controlling a video cassette recorder to access programs on a video cassette tape is known in the current state of the art. A televison for controlling a video cassette recorder to access programs on a video cassette tape is described in more detail in U.S. Pat. No. 5,543,929, by Mankovitz. The disclosure thereof is incorporated herein in its entirety by reference thereto. The Mankovitz patent discloses retrieving a directory of programs from a television signal received from a video cassette recorder. The television displays the directory of programs and a television viewer is able to select a program from the directory of pre-recorded program for viewing. Upon selection of a program, the tape will either be advanced or rewound to position the video cassette recorder at the beginning of the selected program.

Figure 11:
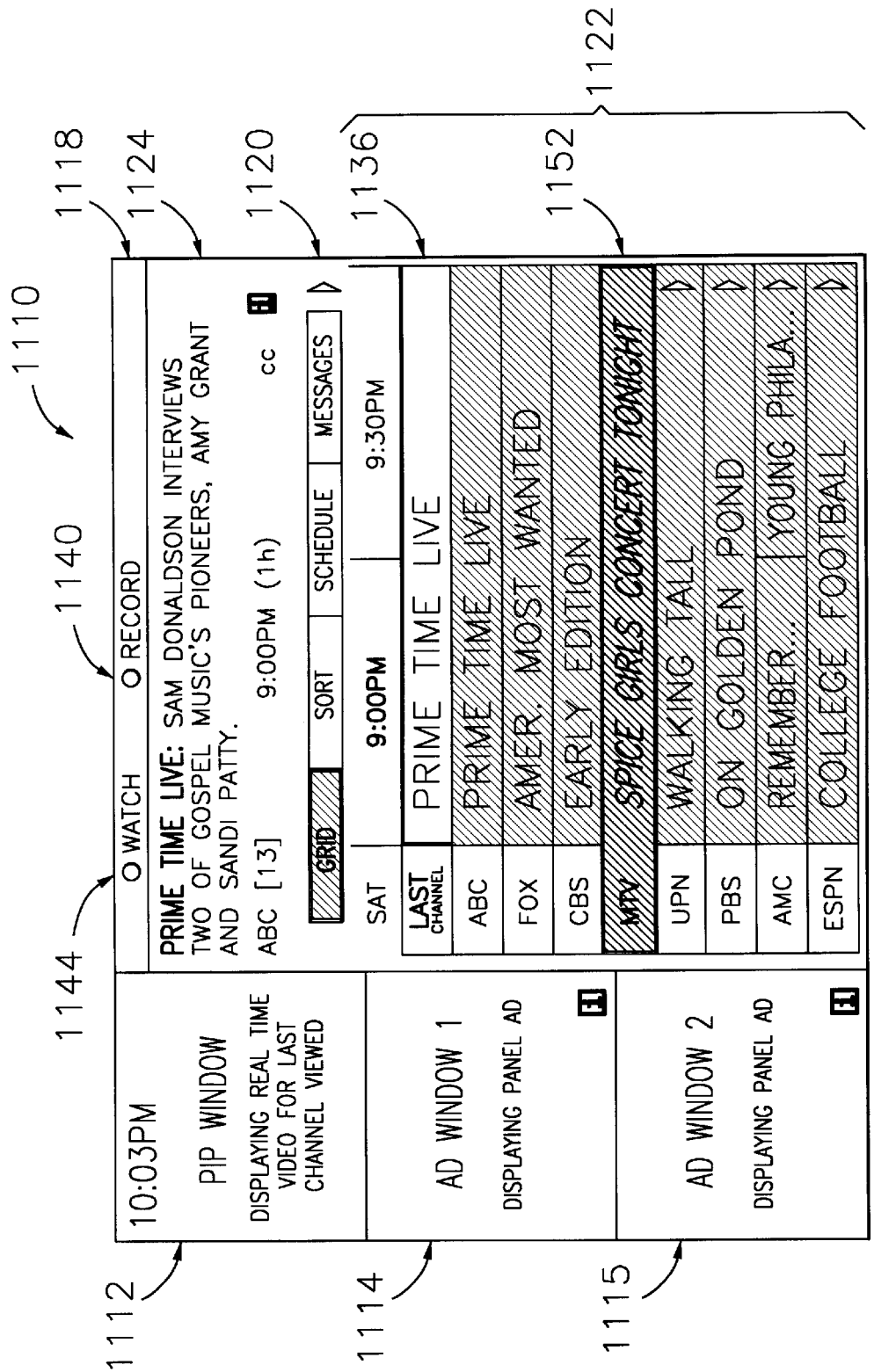
FIG. 11 illustrates an exemplary grid screen showing a line up of programs to be recorded.

FIG. 11 illustrates an embodiment of a guide screen utilizing picture-in-picture inserts. The embodiment of FIG. 11, all shows scheduled to record or be watched are displayed in the schedule. A table of shows to be watched are selected by activating the watch button 1144. A table of shows to be recorded are shown by activating the record button 1146. Shows may be removed or added to the list, and frequencies of recording may be set. A show may be set to be recorded once, daily or weekly from this screen. In the embodiment shown, three picture-in-picture (PIP) windows 1112,1114,1116 are shown. In these PIP windows, supplemental information relating to a recorded show may be presented including videotaping reminders.

The ad windows 1112,1114,1116 of FIG. 11 provide producers of infomercials with an extended capability to reach viewers through the ad windows. Because of the cost of buying advertising time, a growing number of product manufacturers produce infomercials that are shown at relatively inexpensive off-prime-time schedules, often on non-prime channels. If the ad window displays information about a particular product, pressing a record button will instruct the EPG to record an infomercial or advertisement being displayed. Thus, when the infomercial is broadcast on a non-prime channel at a non-prime-time, it will be recorded for later viewing. The same procedure is used to load a videotaping reminder. The EPG provides producers of infomercials with the opportunity to provide a viewer with the opportunity to view a video clip about the product being advertised, or to bring a taped show to the immediate attention of a viewer.

Depending upon the embodiment and/or viewer option selections, the video clip is shown in the PIP window, the ad window, or on a full screen. Upon termination of the video clip, the EPG typically returns to the mode in which the viewer was operating immediately before selecting the option that triggered the display of the video clip.

In addition to PIP windows, panel ads are available for paid advertisements. Space is available in an embodiment of the guide for two panel ads that occupy approximate ⅕ th of the total screen area. When a given ad space is not sold, the space is filled with a placeholder ad, stored in ROM, and inserted in the available space, or with a bonus ad. This space is also available for viewing a videotaping reminder.

The EPG provides producers of infomercials with extended capabilities to reach viewers through Virtual Channel Ad Slots, also referred to as Channel ads. Virtual Channel Ad Slots appear as rows of the grid guide and typically show the titles of the programs that are scheduled for a particular channel. The EPG grid guides Virtual Channel Ad Slots provide advertisement to be displayed as a row in the grid guides schedule of programs. The Virtual Channel Ad Slots act like a channel entry in the grid guide, in that the viewer can record, watch or schedule for watching and/or get information about the advertised program in the information detail box of the grid guide. Channel ads do not occupy a fixed area. Channel ads are essentially inserted between channels in the grid. If there are no channel ads sold, the grid will simply be a continuous list of channels/show titles with no gaps. In an embodiment this area is also utilized for insertion of a videotaping reminder.

Figure 12:
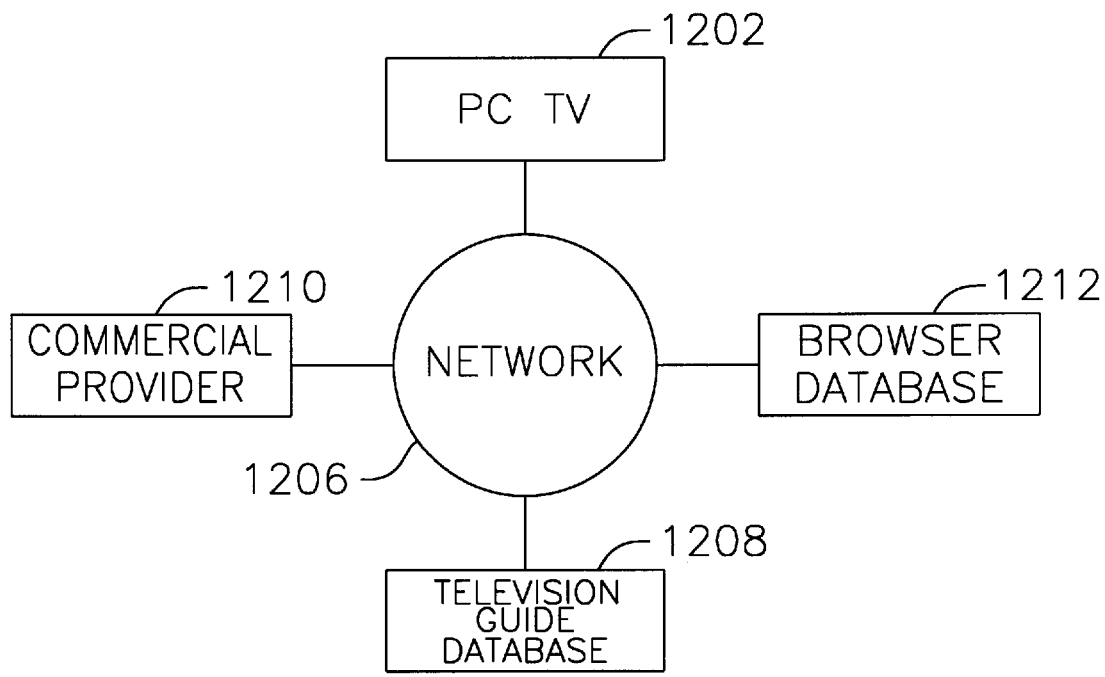
FIG. 12 is a block diagram illustrating sources of advertisement for display with the videotaping reminders.

FIG. 12 is a block diagram illustrating sources of advertisement for display in conjunction with the videotaping reminders. The EPG can select advertisements from various possible locations, including but not limited to: a library of advertisements stored at the viewer's terminal (in a RAM) that have been downloaded through the VBI, stored at the head-end, or accessible through an EPG link to the Internet/World Wide Web. The advertisements may be in the form of graphics, text, video clips, audio clips, and combinations thereof. Each advertisement can be assigned theme codes, profile codes, and other selection intelligence.

In another embodiment, the advertisements in the library are also assigned particular television programs or classes of television programs. The history of television programs entered into a "record-watch list" as shown in FIG. 11 are recorded; and the results are analyzed to decide which advertisement to display. The assumption in basing advertising selection upon recording a particular program is that people using the EPG and watching a program at a different time in which it is broadcast have different interests. In addition, information concerning when the recorded program is watched provides an indication to advertisers about the viewer for profiling purposes. The display and recording interface with television programs, video, advertising information and program scheduling information is described in more detail in co-pending U.S. patent application Ser. No. 09/120,488 filed Jul. 21, 1998, entitled "System and Methods for Displaying and Recording Control Interface with Television Programs, Video, Advertising Information and Program Scheduling Information." The disclosure thereof is incorporated herein in its entirety by reference thereto.

In an embodiment of the invention, a database of videotaping reminders, advertising messages and virtual channel ads are stored in RAM at a viewer terminal or are accessible at a website if the viewer terminal has an Internet connection. In either case, the advertising items in the database are labeled with coded categories that correspond to coded category labels assigned to the telecast television programs.

What is claimed is:

1. A process for generating a reminder that a video recording has been made comprising:

displaying a schedule of programming listed in an electronic program guide (EPG) including a program displayed in the schedule of the EPG designated for recording;

programming a video recorder to record the selected program;

recording the program;

determining if a video recording reminder has been assigned to the program;

activating the video recording reminder if the reminder has been assigned to the program for indicating a user that the selected program has been recorded; and automatically triggering display of the video recording reminder in response to a pre-determined event.

2. The process for generating a reminder that a video recording has been made of claim 1, further comprising generating a recording library to be displayed with the reminder that a video recording has been made.

3. The process for generating a reminder that a video recording has been made of claim 1, further comprising generating a PIP display in response to the display of the reminder.

4. The process of claim 1, wherein the video recording reminder includes an advertisement.

5. The process of claim 4, wherein the advertisement is associated with the recorded program.

6. The process of claim 4, wherein the advertisement is selected based on viewer profile information.

7. The process of claim 1, wherein the video recording reminder includes a picture-in-picture (PIP) display.

8. The process of claim 7, wherein the PIP display displays a portion of the recorded program.

9. The process of claim 7, wherein the PIP display displays an advertisement.

10. The process of claim 1, wherein the predetermined event is passage of a predefined amount of time since the recording of the program.

11. A device for generating a reminder that a video recording has been made comprising:

an electronic program guide having a listing of subject matter suitable for video recording and capable of displaying reminders that a video recording has been made;

a memory for storing the listing of subject matter suitable for video recording and a set of associated indicators that are selectively applied to generate a reminder that the video recording has been made;

a decoder for receiving the listing of subject matter suitable for video recording and the set of associated reminders;

a micro controller for coordinating the reception of the listing of subject matter suitable for recording and set of indicators and their storage into the memory;

a video recorder capable of being programmed under control of the EPG; and means for automatically triggering display of the video recording reminder in response to a pre-determined event.

12. The device for generating a reminder that a video recording has been made of claim 11, in which the EPG transmits viewer profile data to a service provider.

13. The device for generating a reminder that a video recording has been made of claim 11, in which the viewer profile data is used to transmit an advertisement associated with a reminder.

14. The device of claim 11, wherein the predetermined event is passage of a predefined amount of time since the recording of the program.

15. A device for generating a reminder that a video recording has been made comprising:

a means for generating an electronic program guide;

a means for storing a schedule of programs and associating with each one an independently transmitted reminder capable of initiating generation of a display to remind a viewer that a program has been recorded;

a means for receiving the schedule of programs and the reminder;

a micro controller means for coordinating the recording of the program and the display to remind the viewer that recording has taken place; and a means for recording the program.

16. A device for generating a reminder that a video recording has been made of claim 15, in which the means for receiving a schedule of programs utilizes a video blanking interval of a video signal.

17. A device for generating a reminder that a video recording has been made of claim 15, in which the independently transmitted reminder comprises a packet of data sent in a video blanking interval.

18. The device of claim 15, wherein the predetermined event is passage of a predefined amount of time since the recording of the program.

19. A television system for generating a reminder that a video recording has been made, comprising:

means for receiving a user selection of a television program;

means for controlling a video recorder for recording the selected television program;

means for determining whether a video recording reminder should be activated for the selected television program for indicating to a viewer that the selected television program has been recorded; and means for automatically triggering display of the video recording reminder, the display of the video recording reminder being overlaid on a portion of a current television program.

20. The television system of claim 19, wherein the video recording reminder includes an advertisement.

21. The television system of claim 20, wherein the advertisement is associated with the recorded program.

22. The television system of claim 20, wherein the advertisement is selected based on viewer profile information.

23. The television system of claim 19, wherein the video recording reminder includes a picture-in-picture (PIP) display.

24. The television system of claim 23, wherein the PIP display displays a portion of the recorded program.

25. The television system of claim 23, wherein the PIP display displays an advertisement.

* * * * *

UNITED STATES PATENT AND TRADEMARK OFFICE
CERTIFICATE OF CORRECTION

PATENT NO. : 6,792,197 B1
APPLICATION NO. : 09/456132
DATED : September 14, 2004
INVENTOR(S) : Gary Helmstetter It is certified that error appears in the above-identified patent and that said Letters Patent is hereby corrected as shown below:

Column 1, line 38, change "they have" to --the viewer may--.

Column 2, line 67, change "the" to --a--.

Column 3, line 47, change "start" to --starts--.

Column 6, line 15, change "viewer's" to --viewer--.

Column 7, line 32, change "televison" to --television--.

Column 8, line 17, change "approximate" to --approximately--.

Claim 1, column 9, line 24, change "indicating a" to --indicating to a--.

Signed and Sealed this

Fifth Day of December, 2006

JON W. DUDAS
*Director of the United States Patent and Trademark Office*